Dec. 18, 1923. 1,477,944
C. DE VERE
PHONOGRAPH
Filed Dec. 28, 1920 9 Sheets-Sheet 1

Inventor
Cyril De Vere
By B. Singer
Atty.

Dec. 18, 1923.
C. DE VERE
PHONOGRAPH
Filed Dec. 28, 1920     9 Sheets-Sheet 2
1,477,944
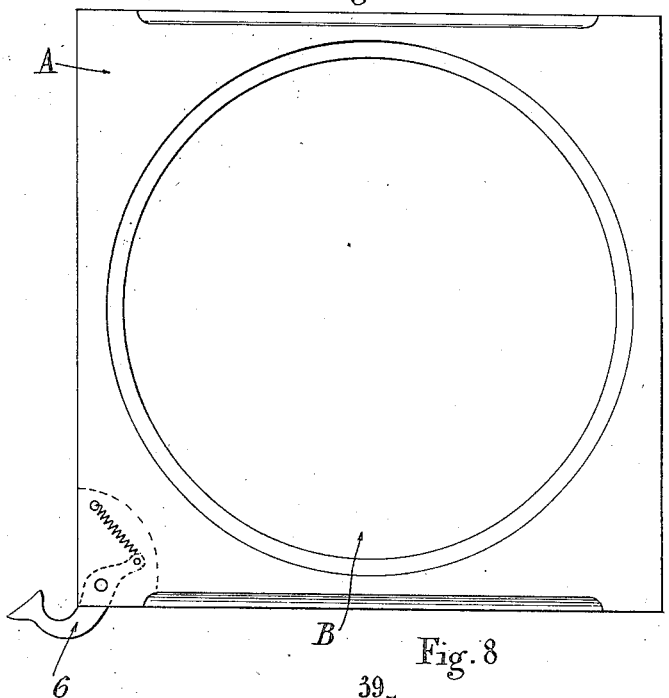
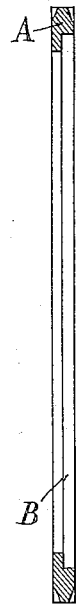
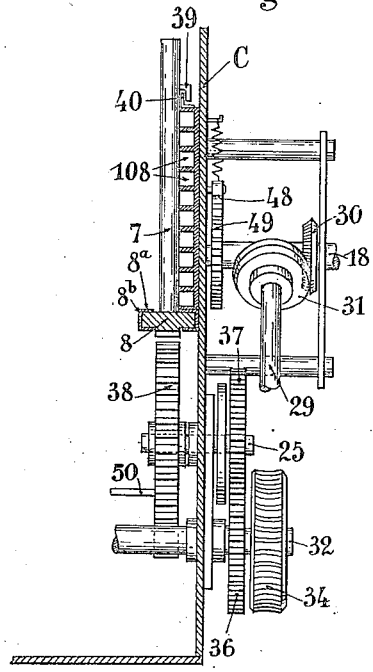

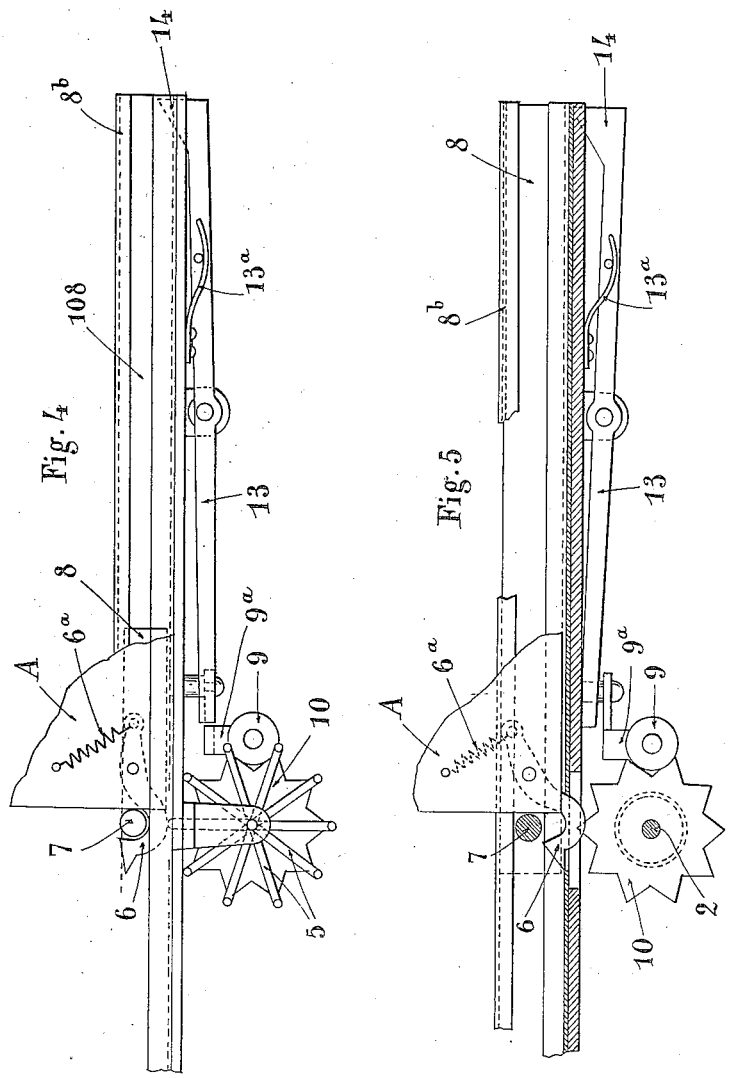

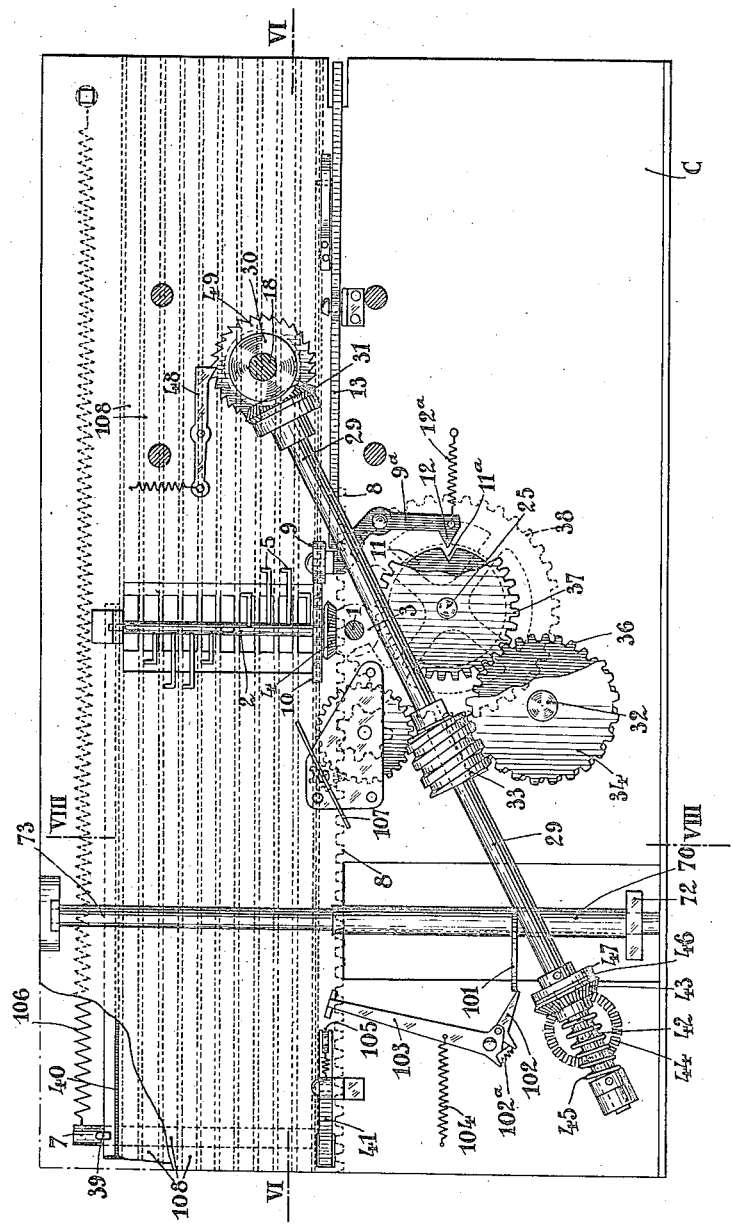

Dec. 18, 1923.

C. DE VERE

PHONOGRAPH

Filed Dec. 28, 1920

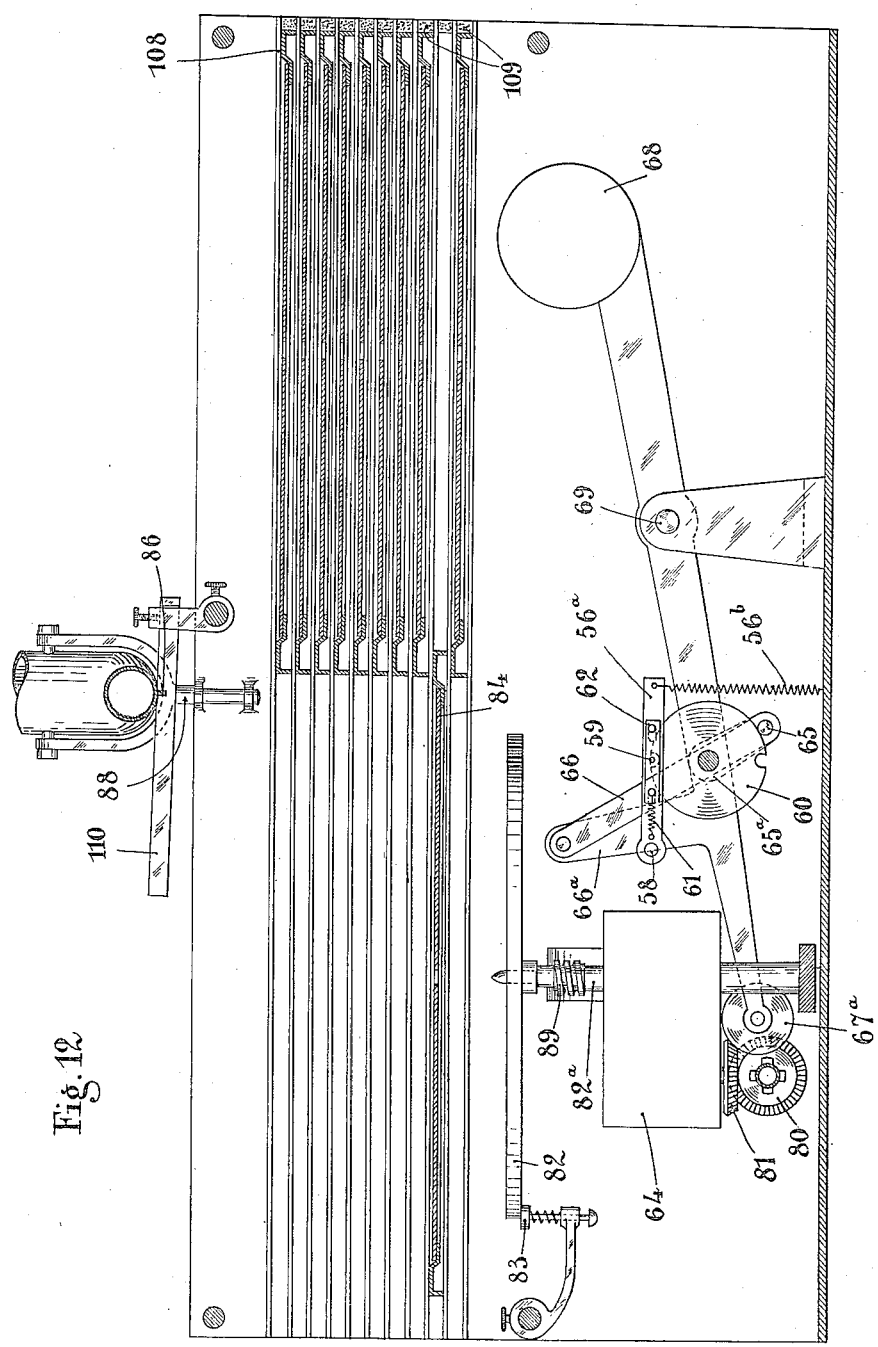

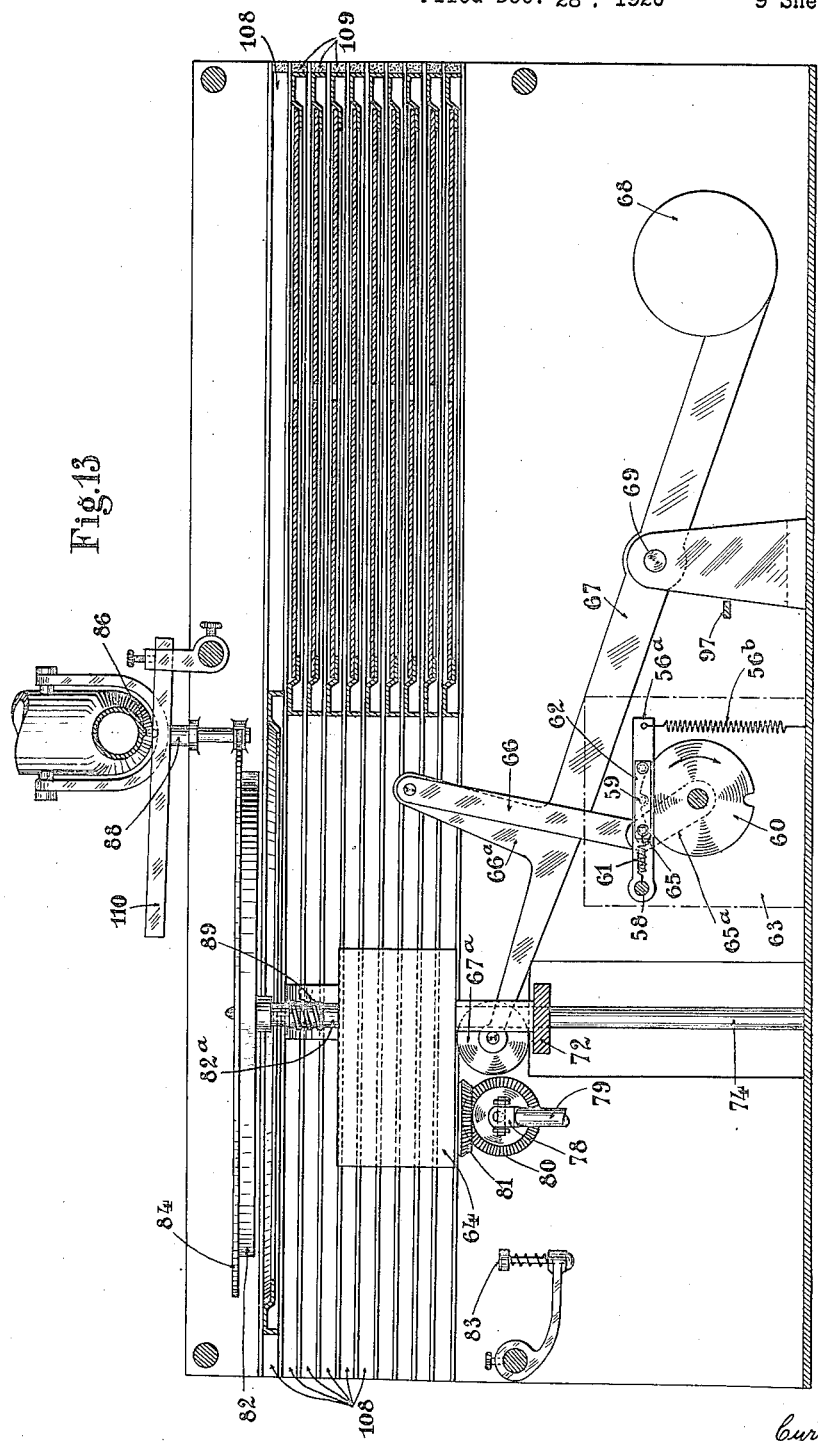

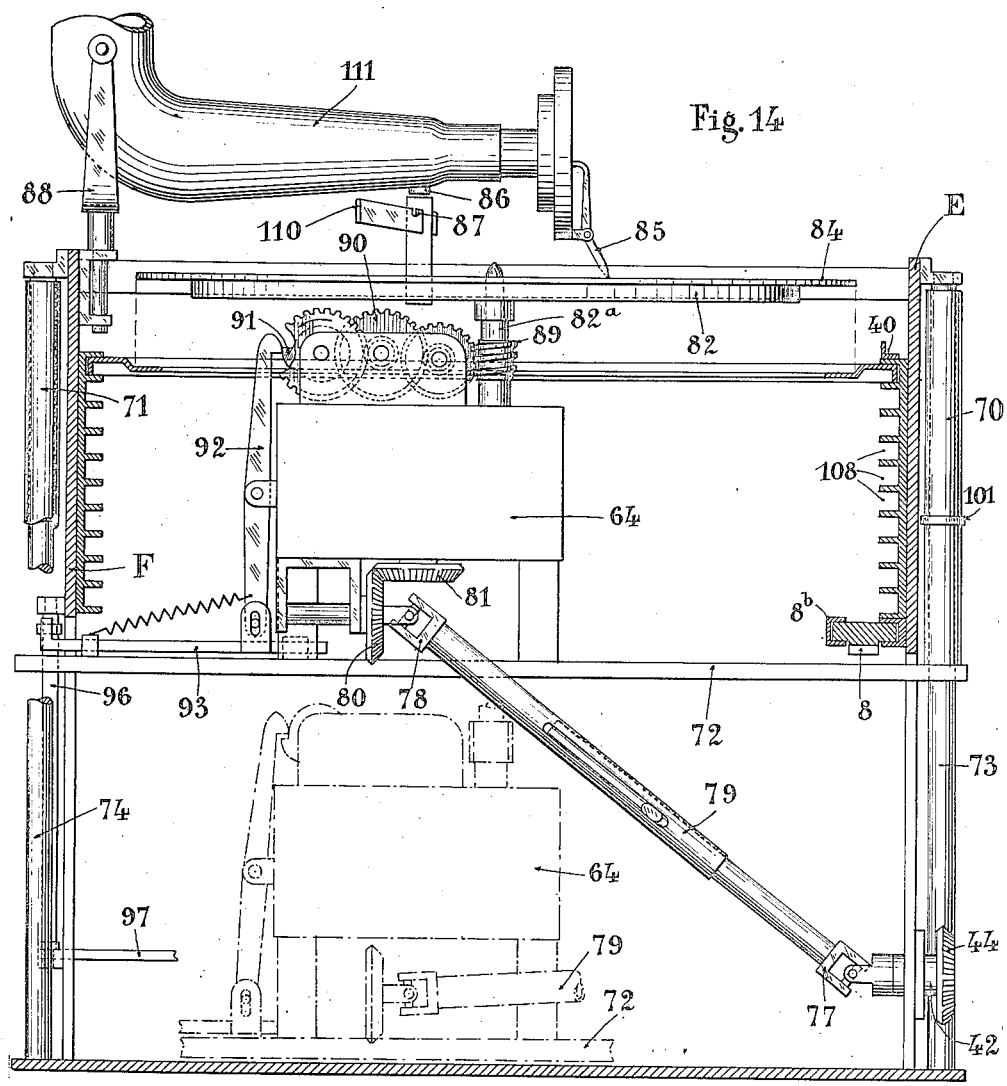

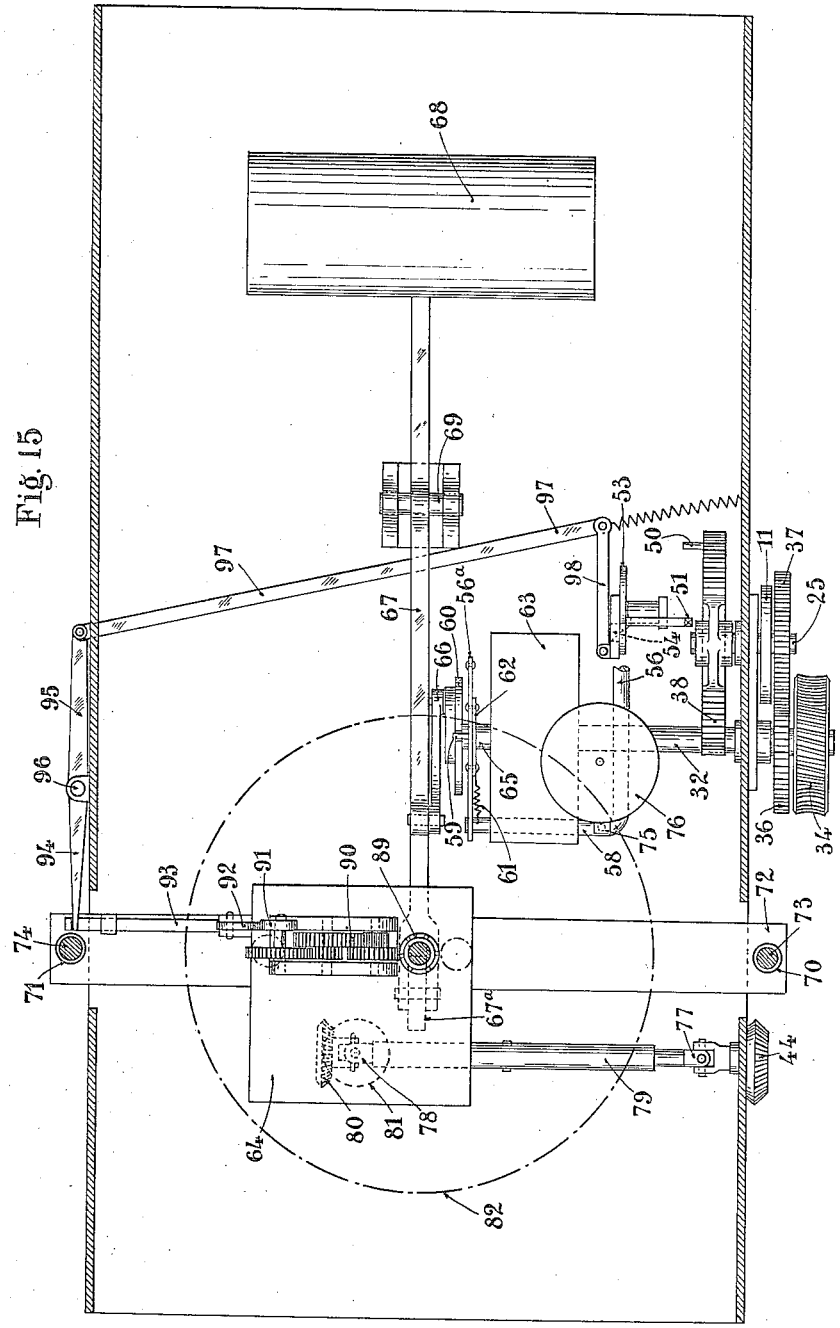

Patented Dec. 18, 1923.

1,477,944

UNITED STATES PATENT OFFICE.

CYRIL DE VERE, OF PARIS, FRANCE, ASSIGNOR TO LA SOCIETE DES PHONOGRAPHES AUTOMATIQUES, OF PARIS, FRANCE.

PHONOGRAPH.

Application filed December 28, 1920. Serial No. 433,733.

*To all whom it may concern:*

Be it known that I, CYRIL DE VERE, manufacturer, citizen of the Republic of France, residing at 4 Rue Carpeaux, Paris, France, have invented certain new and useful Improvements in or Relating to Phonographs (for which I have filed application for patent in England, provisional application dated July 15, 1919, and complete application dated February 6, 1920, #17704/19), of which the following is a specification.

This invention relates to improvements in magazine phonographs of the type comprising a set of vertically superposed carriers, each adapted to hold a disc record, which are arranged so that any selected carrier can be brought into such a position that vertical displacement of a turntable will cause the record held by the selected carrier to engage with the said turntable, so that the record may be rotated thereby and played.

A magazine phonograph of the above type has been proposed in which the bringing into position of the selected record ready for engagement by the turntable is effected by a vertical displacement of all the carriers so as to bring the carrier holding the selected record to a definite height, followed by a horizontal displacement of the said selected carrier at the said definite height into a position immediately above the turntable, the subsequent vertical displacement of the turntable being of limited extent.

It has also been proposed that after the selection of the record, the binding into position of the selected record and the playing of the same should be effected automatically by the movement of one handle only. But the arrangement is such that the selected record is placed into position and started before the complete winding up of the spring. This is liable to lead to insufficient winding.

The present invention consists in an improved magazine phonograph of the type first above referred to, in which the bringing into position of the selected record ready for engagement by the turntable is effected by a solely horizontal displacement of the carrier holding the selected record, the subsequent vertical displacement of the turntable being substantially equal to the height of the set of superposed carriers.

This magazine phonograph may be designed for use by the public, in which case it can be arranged to be worked only by the insertion of a coin into a slot, or it can be adapted for private use, in which case it is to be worked directly by means of a crank handle.

The following description relates to a magazine phonograph worked directly by means of a crank handle.

The playing of the selected record contained in the magazine is effected simply by the two following operations:—

(1) The pointer of the selecting mechanism is moved opposite a number corresponding to the said record in a list fixed on the outside of the apparatus.

(2) The crank handle is turned a certain number of times, according to the instructions, in the direction of an arrow.

The magazine phonograph comprises in compact arrangement:—

A magazine for disc records;

A selecting mechanism for selecting the disc;

A rack bar for conveying the selected disc out of the magazine;

A first spring motor mechanism for imparting to the disc the rotary motion necessary for playing the record thereon;

A second spring motor mechanism for raising the first spring motor mechanism, and the selected disc so as to bring the latter into contact with the sound-box;

Various automatic mechanisms for actuating all these devices, and

Various safety devices for preventing the apparatus from being damaged.

This invention will now be described more fully with reference to the accompanying drawings wherein:—

Fig. 2 is a plan view of a disc carrier.

Fig. 3 is a cross section of the same.

Fig. 4 is a plan view of the selecting mechanism, the apparatus being in the playing position.

Fig. 5 is a horizontal section of the same with some members in different positions to those shown in Fig. 4, the apparatus being in the rest position.

Fig. 6 is a horizontal section on the line VI—VI of Fig. 7, the apparatus being in playing position.

Fig. 7 is a front view of the apparatus showing the different devices attached to the front plate with the exception of the crank.

Fig. 8 is a vertical section on the line VIII—VIII of Fig. 7.

Fig. 12 is a longitudinal vertical section showing in its lower position the mechanism for lifting and lowering the record carrier and its spring motor mechanism.

Fig. 13 is a similar view showing said mechanism in its upper position.

Fig. 14 is a vertical cross section showing in full lines the record-carrier and its spring motor mechanism in the raised position and in dot and dash lines in the lowered position.

Fig. 15 is a plan illustrating the mechanism for effecting the lowering of the record carrier and its spring motor mechanism, the other devices being not shown for the sake of clearness of the figure.

Figure 1:
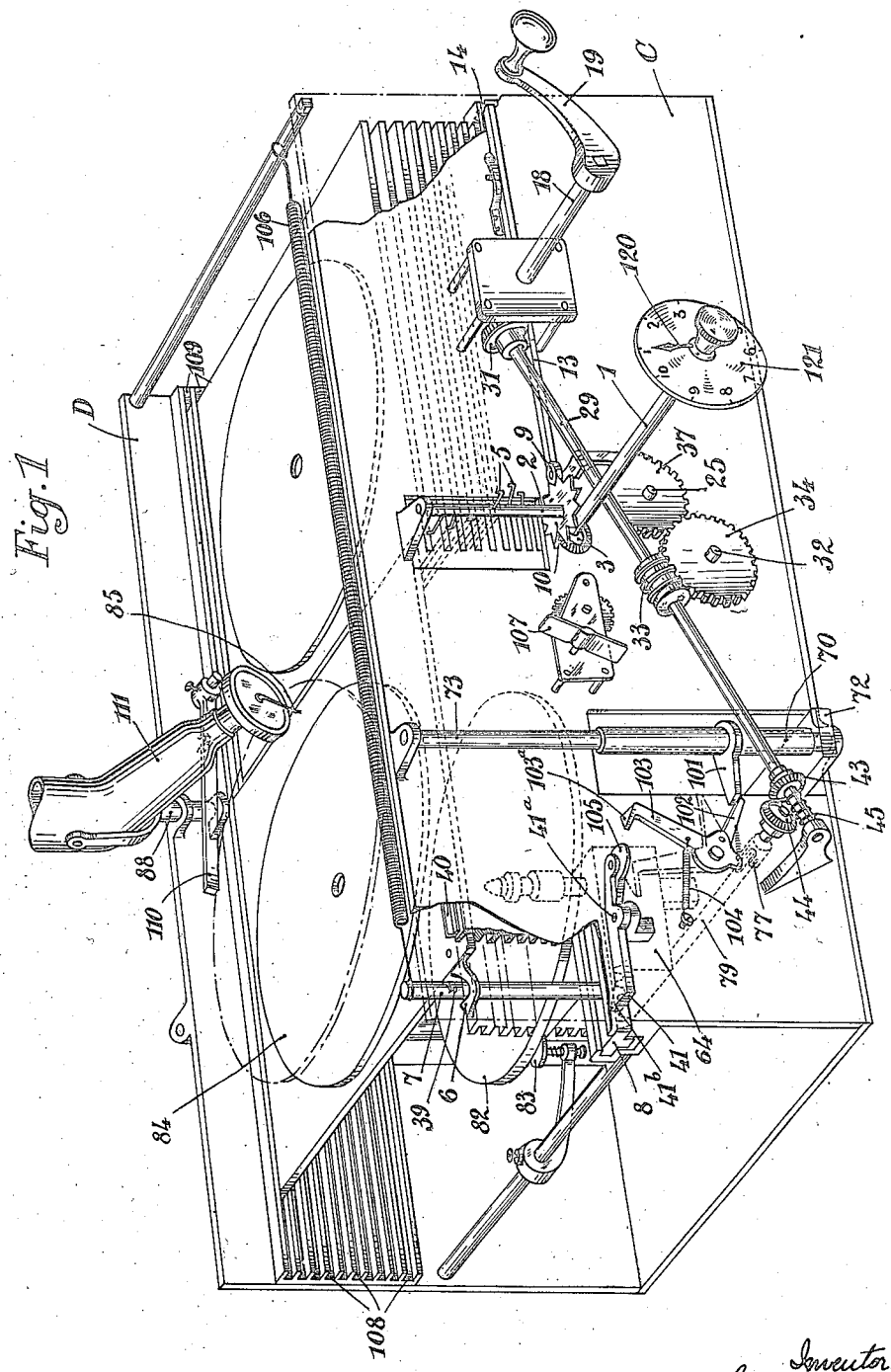
Fig. 1 is a perspective view of the whole apparatus showing the selecting mechanism with its safety devices, and the main parts for actuating the turntable, the upper disc having been brought above the turntable.

The construction and operation of the mechanism for selecting the desired record are hereinafter described:

The whole apparatus is contained within a casing the front and rear walls of which are designated by C and D (Fig. 1), the side walls E and F not being shown in said figure. Each record disc is placed on a disc carrier A, provided at its central part with an opening B, the diameter of which is smaller than the diameter of the record so that the latter rests on the carrier only by its peripheral part. The carriers may slide inside grooves 108 diametrically opposed, so that the disc may come exactly above the turntable and may be raised during the upward vertical movement of the latter. In order to select the preferred disc, the pointer 129 (Fig. 1) which is situated on the outside and which is designed to be moved upon the dial 121 to a number corresponding to the selected record, is mounted on a shaft I (Fig. 1 and Fig. 7) which imparts rotation to the vertical shaft 2 through bevel pinions 3 and 4. On the shaft 2 there are mounted horizontal rods 5 with upturned ends so arranged that when the pointer has been moved opposite a number, the corresponding rod will push the hook 6 of the selected disc-carrier as shown in Fig. 2. A rod 7 fixed vertically to the rack bar 8 is then able to move the disc. During the beginning of the translation of the disc-carrier, the hook 6 leaves the rod 5, but then comes into contact with the bottom of the groove 108 (Figs. 4 and 8) inside which the carrier slides, and is thus maintained in engagement with the rod 7 driving the disc-carrier. The hooks 6 of the other discs are held back by their springs 6ª (Figs. 4 and 5).

Fig. 8 shows that the rack bar is provided over its whole length with lateral flanges 8ª sliding inside two fixed U-shaped pieces 8ᵇ.

This selecting mechanism comprises also a safety device operating as follows:—

If two rods 5 should be in contact with their hooks, the roller 9 mounted on a pivoted lever 9ª and rolling on the ratchet wheel 10, is at that time at the top of a tooth, with the result that the wheel 11 mounted on the shaft of a pinion 38 driving the rack is "blocked" by the knife edge 12 of the lever 9ª inserted into the notch 11ª of said wheel and thus any operation of the apparatus is prevented. The lever 9ª is held back by its spring 12ª (Fig. 7).

When the apparatus is working, another safety device consists of a spring controlled lever 13 (Figs. 1, 4 to 7) whose blocking position is shown in Fig. 4, in which the end above the rack bar is shown in dotted lines as it permits this blocking. When the apparatus is in the position shown in Fig. 5, the end of the rack bar 8 pushes back the pointed projection 14 of lever 13 and maintains the left hand end of the latter out of engagement with the lever 9ª, but when the rack bar has been moved to the left (Figs. 1, 5 and 6), the spring 13ª brings the lever 13 in the position shown in said figures, and the left hand end of said lever prevents the lever 9ª from pivoting.

The starting of the apparatus by means of a suitable number of revolutions of the driving crank is effected in the manner hereinafter described with reference to Figs. 6, 7 and 8.

The shaft 18 on which the driving crank 19 is fixed, drives the oblique shaft 29 by means of two bevel pinions 30 and 31. The shaft 29 drives the shaft 32 through a worm 33 and its worm wheel 34. The shaft 32 is connected to the spring of the spring motor mechanism 63 (Fig. 15) hereinafter mentioned, for lifting and lowering the spring motor 64 and the turntable 82. Since this spring motor makes one revolution during a complete operation of the apparatus, the pinions are so arranged that the shaft 32 will make only one revolution for instance for eight revolutions of the crank. The shaft 32 also drives the shaft 25 (Figs. 1 and 15) by the intermediary of two spur pinions 36 and 37. On this shaft 25 is fixed the toothed wheel 38 engaging with the rack bar 8. While rotating, this toothed wheel brings the rack bar into the position shown in Figs. 1, 6 and 7. The said toothed wheel 38 is cut in the part of its circumference corresponding to the position of the rack bar shown in said Fig. 7. The rod 7 fixed on the said bar brings the selected disc exactly over the disc-carrier in such a manner as to be capable of being engaged by the latter and brought into contact with stylus 85 connected to the sound-box. The rod 7 is guided in its movements by the nib 39 and the angle iron 40.

The rack bar at the end of its travel is held by a pointed projection constituted by the end of a lever 41 which engages in a corresponding notch 41$^b$ (Fig. 6).

The shaft 29 drives the shaft 42 through two bevel pinions 43 and 44. This shaft 42 serves to wind the spring of the spring motor 64 that produces the rotation of the discs. The pinion 43 is not fixed on the shaft 29 but is pressed by a spring 45 against a fibre disc 46 (Fig. 7) fixed on a plate 47 keyed on the shaft 29, so that when said spring has been completely wound, the pinion 43 will remain stationary and the plate will slip. The assembly of pinions 30, 31 and 43, 44, is suitably multipled in order to afford the complete winding of the spring motor 64 by means of the eight turns of the crank 19.

In order to avoid the risk of turning the crank in the wrong direction, its shaft 18 carries a ratchet wheel 49 engaged by a spring pawl 48 (Fig. 7).

Figure 9:
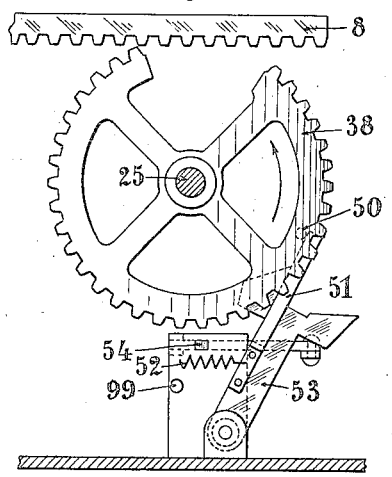
Figs. 9, 10 and 11 illustrate the devices for producing lifting motion.
Figure 10:
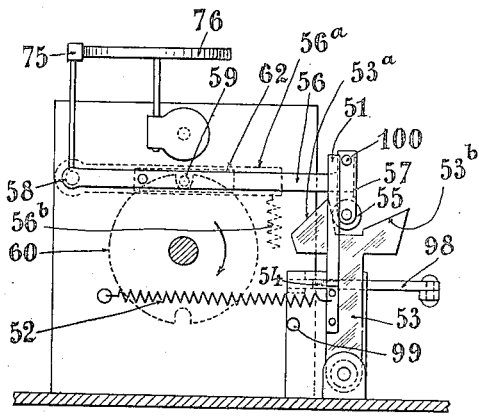

The toothed wheel 38 engaging with the rack carries a pin 50 (Figs. 9, 10 and 11) which, after having moved the rod 51 into the position shown in Fig. 9, releases it when the rack has completed its outward movement; the rod 51 is then moved back by its spring 52 together with the rocking arm 53 on which it is fixed. This rod 51 is stopped in the position shown in Fig. 10 by the stud 54 (Figs. 9, 10 and 15) the latter being actuated as it will be seen hereinafter, but in this return movement the first tooth 53$^a$ of the lever 53 has lifted the roller 55 and consequently the arm 56 (Figs. 10, 11 and 15) to which it is connected by means of the lever 57 mounted on said arm 56 by means of the axle pin 100 and may rock to the right but not to the left. The arm 56 is fixed to a shaft 58 whose other end carries an arm 56$^a$ recalled by the spring 56$^b$. The pin 59 fixed to the flat member 62 slidable on arm 56 has moved out of the notch of the wheel 60 in the raising of the arm 56 and has not dropped owing to the spring 61 (Fig. 12) which has moved it back together with the part 62 on which it is fixed, the said part 62 being slidably attached to the arm 56 as shown in the drawings (Fig. 12).

The wheel 60 fixed to the spring motor 63 (Figs. 12 and 15) being thus released begins to turn and to lift the spring motor 64 as well as the turntable for the disc record through the medium of the pin 65 on a crank 65$^a$ secured to the wheel 60; the pin 65 is coupled by a connecting rod 66 to an arm 66$^a$ on the lever 67 which also rises and carries up the spring motor 64 by the intermediary of the roller 67$^a$. The spring motor 64 is balanced by a counterweight 68 fixed to the other end of the lever 67 which is fulcrumed on the axle 69. This spring motor is guided in its rise by two tubes 70 and 71 (Fig. 14) fixed on a cross member 72 and adapted to slide along vertical rods 73 and 74.

Figure 11:
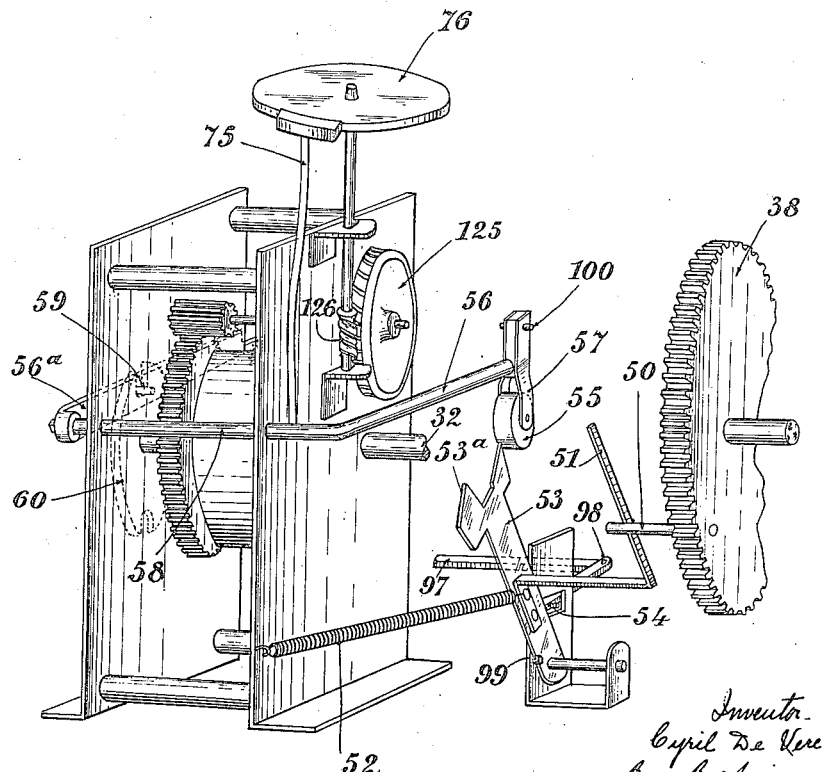

When the wheel 60 has made half a revolution, the pin 59 drops into the second notch and since the stoppage is not instantaneous, the part 62 is pulled, and the spring 61 is tensioned again. In order to avoid the stoppages causing too great strains upon the wheel 60 and the part 62, the arm 56 and the axle 58, a brake shoe 75 (Figs. 10 and 11) mounted on a rod fixed to the axle 58 exerts a braking action, each time the pin 59 enters one of the notches of the wheel 60, upon a wheel 76 actuated by the spring motor 63 by means of the wheel 125 and the worm 126 (Fig. 11).

The spring motor 64 has been wound by the shaft 42 through the medium of two universal joints 77 and 87 (Figs. 1 and 14) of an extensible shaft 79 and two pinions 80 and 81.

The disc-carrier plate or turntable 82 (Figs. 12, 13 and 14) is braked when it is in its lower position, by a brake shoe 83; but immediately it rises, it loses contact with the said brake-shoe, and resumes its rotational motion. In rising it meets the disc 84 which has been brought in its carrier above it by the rack bar as above described, and it raises the disc which comes into contact just before its point of maximum ascent, with the needle 85 of the sound box. The latter is maintained exactly at the necessary place by a stud 86 engaging in the notch 87 (Fig. 14). This stud serves as a guide to the sound-box and compels its needle to engage in a thread of the disc and thus prevent the " derailing " which takes place sometimes in the ordinary apparatus. The sound-arm 111 is mounted on a pivot 88 and is connected either to a horn or to one or more acoustic tubes.

On the vertical shaft 82$^a$ of the disc-carrier plate there is fixed a worm 89 which drives a speed-reducing device 90 so constructed that the cam 91 will make one revolution during the entire playing of a disc. Moreover, this cam is fixed in such a manner that when the playing of the disc is terminated its boss will cause the lever 92 to rock, so that the opposite end of the said lever will pull the rod 93 to the right (Fig. 14). The latter by means of levers 94 and 95 (Fig. 15) pivoting about the axle pin 96 pulls the rod 97, thus causing the rocking of the lever 98 on which the tappet 54 is situated. The latter is thus moved towards the rear and the lever 53 (Figs. 10 and 11) thus released rocks anew toward the left, and strikes the tappet 99. In this movement the second tooth 53ᵇ of the said lever raises again the roller 55, like the first time, this movement having for effect to release the wheel 60 which makes a further half revolution and returns the spring motor 64 with the turntable into the position shown in Fig. 12, by means of the crank 65ᵃ, connecting rod 66, arm 66ᵃ and lever 67. During the descent, the disc is deposited upon its carrier.

When the crank handle 19 is turned afresh for a next operation of the apparatus, the pin 50 moves the rod 51 and the arm 53 again into the position shown in Fig. 9. During this movement the teeth of the arm 53 cause the support 57 of the roller 55 (Fig. 10) to rock to the right on its axle 100, and the latter returns by gravity into the position shown in Fig. 9, without the lever 56 being raised.

When the spring motor 64 of the disc carrier plate has returned into its lower position, the return of the disc on its carrier into the magazine is effected in the following manner:—

The tube 70 which is fixed to the spring motor 64 by means of the bar 72 (Figs. 1 and 14) and guides the upward movement of spring motor 64 and turntable 82 as abovesaid, carries a stop 101 which in descending, brings through the medium of the tappet 102 the lever 103 into the position shown in Figs. 1 and 7. When the spring motor 64 has almost reached the bottom, the tappet 102 escaping from the stop 101 allows the lever 103 to be moved rapidly backwards by the spring 104. Its end comprising an inclined pusher 103ᵃ as shown in Fig. 6 causes the lever 41 to rock on its axle 41ᵃ by means of the stop 105 which is pushed towards the rack bar and this has the effect of releasing the rack bar 8 that was being held by the nose of the lever 41 engaged inside the notch 41ᵇ. The rack bar is then returned to its initial position by the action of the spring 106 which pulls the rod 7 that is fixed on it without driving back the wheel 38, as the rack bar is opposite the cut away portion of said wheel. In this manner the disc which has been played, is returned to the magazine.

In order that the return movement shall not be too abrupt the rack bar actuates either a fly 107 or any suitable braking device. For the purpose of deadening the shock at the end of the course, the grooves 108 (Fig. 12) in which the disc-carriers slide have rubber stops 109 at their ends.

During the ascent of the spring motor, the stop 101 (Fig. 7) raises the tappet 102 which rocks on its axle without actuating the lever 103 and is brought back by the spring 102ᵃ.

When the spring motor 64 (Fig. 12) moves down again, the sound arm 85 is stopped by the inclined surface 110 along which it slides until the stud 86 drops back into the notch 87.

The operation of the phonograph may be recapitulated as follows:—

First, a record disc is selected by rotating the shaft 1 in order to bring the index 120 opposite the corresponding member of the dial 121. This brings the corresponding arms 5 into contact with the hook 6 of the desired disc-carrier and engages said hook with the vertical rod 7 secured on the rack bar 8.

By rotating the crank 19, and thereby the toothed wheel 38 engaging the rack bar 8, said rack bar is translated horizontally with the rod 7 and the selected disc-carriage. By this movement the disc is brought above the turntable 82, and meanwhile the disc selecting device is blocked by means of the lever 13 moved by its spring 13ᵃ and engaging with the lever 9ᵃ.

Moreover, when the movement of the rack bar is over the nose piece of the lever 41 engages the corresponding notch 41ᵇ of the rack bar.

During the rotation of the crank 19, the shaft 29 has been rotated also by the intermediary of the pinions 30 and 31, and the shaft 29 drives the shaft 32 through the worm 33 and the worm wheel 34, and by this movement the spring of the spring motor 63 is wound up.

During the rotation of the toothed wheel 38, the stud 50 pushes the pivoting arm 53 to the right (Fig. 8) and releases the same when the rack bar has completed its movement. The arm 53 is then returned to the left by the spring 52 and the tooth 53ᵃ raises the pivoting arm 56 by the intermediary of the roller 55. The stud 59 is thus disengaged from the notch of the wheel 60 which begins to rotate under the driving action of its spiral spring. The crank 65ᵃ rotates with the wheel 60, and the turntable 82 and its spring motor 64 are lifted by the intermediary of the connecting rod 66. At the same time, the shaft 29 actuates the pinions 43, 44, the shafts 42 and 79, the pinions 80 and 81 and thereby winds up the spring motor 64 of the turntable 82 which begins to turn slowly until it is out of contact with the brake shoe 83.

On its way up, the turntable passes through the disc carriage, raises the record disc, drives it in its rotation and brings it into contact with the needle 85 of the reproducer which stays at the right place as it has been seen above, and the reproduction of the record disc begins.

Meantime the wheel 60 has made one half turn and the pin 59 has dropped into the second notch, stopping the rotation of the wheel 60 and the raising of the turntable.

During the reproduction of the disc the cam wheel has made one revolution, so that when the reproduction is over the cam pushes the pivoting lever 92 which actuates the rods 93, 94, 95, 97, the latter actuating the tappet 54 which releases the arm 53 returned towards the left (Figs. 10 and 11) by the spring 52. The second tooth 53$^b$ raises again the arm 56, releases again the wheel 60 and causes the descent of the turntable 82 with the record disc by means of the crank 65$^a$ and connecting rod 66.

It results from the above description that during the descent of the turntable:—

1. The record disc is laid upon its carriage.

2. The rocking arm 102 is pushed down and then suddenly released and returned by the spring 104, thus causing the lever 103 to strike on the pivoting lever 41 and to disengage its nose from the rack bar 8 which may be moved backwards to its initial position by the spring 106. By the return movement of the rack bar the record disc and its carriage are brought back into the magazine, this movement being braked by the fly 107.

3. The end of the descent of the turntable and its rotation are braked by the brake shoe 83.

4. The sound arm slides along the inclined ridge 110 and is brought back to its initial position, corresponding to the beginning of the reproduction of a record disc, the stud 86 dropping back into the fixed notch 87.

The phonograph is now ready for a following operation.

I claim—

1. A magazine phonograph comprising a plurality of superposed disc-holding carriages, means for guiding said carriages horizontally, a vertically movable turntable, feeding means adapted to move any one of said carriages in said guiding means so as to bring a record disc over said turntable, selecting means for coupling the selected carriage to said feeding means, a sound reproducer located at the upper part of the phonograph, means for rotating the turntable, means adapted to lift the selected record disc, the turntable and its rotating means and hold the record disc in engagement with the reproducer, and automatic means for returning said turntable, said rotating means and said selected disc within its carriage to their position of rest when the playing of the record disc is over.

2. A magazine phonograph, comprising a plurality of superposed disc-holding carriages, means for guiding said carriages horizontally, a vertically movable turntable, feeding means including a rack bar adapted to move any one of said carriages in said guiding means, so as to bring a record disc over said turntable, selecting means for coupling the selected carriage to said feeding means, a sound reproducer located at the upper part of the phonograph, means for rotating the turntable, a rotary starting handle (19) and means for operatively connecting said handle to the rack bar and to the rotating means for the turntable, means adapted to lift the selected record disc, the turntable and its rotating means and hold the record disc in engagement with the reproducer and automatic means for returning said turntable, said rotating means and said selected disc within its carriage to their position of rest when the playing of the record disc is over.

3. A magazine phonograph comprising a plurality of superposed disc-holding carriages, means for guiding said carriages horizontally, a vertically movable turntable, feeding means including a rack bar adapted to move any one of said carriages in said guiding means so as to bring a record disc over said turntable, selecting means for coupling the selected carriage to said feeding means, a sound reproducer located at the upper part of the phonograph means for rotating the turntable, a rotary starting handle (19) and means operatively connecting said handle to the rack bar and to the rotating means for the turntable, a wheel (60) provided with notches, a spring barrel for rotating said wheel, means including a crank and a connecting rod adapted to transform the rotation of said wheel into the vertical translation of the turntable, a counterweight balancing the weight of the turntable with its rotating means, means connected to said rack bar and to said turntable for releasing and stopping said wheel successively, and automatic means for returning said selected record disc within its carriage to their position of rest when the playing of the record disc is over.

4. A magazine phonograph comprising a plurality of superposed disc-holding carriages, means for guiding said carriages horizontally, a vertically movable turntable, feeding means including a rack bar adapted to move any one of said carriages in said guiding means so as to bring a record disc over said turntable, selecting means for coupling the selected carriage to said feeding means, a sound reproducer located at the upper part of the phonograph, means for rotating the turntable; a rotary starting handle (19), a toothed wheel (38) operated by said handle and engaging said rack bar, means including a friction clutch for operatively connecting said handle to the rotating means for the turntable, a wheel (60) provided with notches, a spring barrel for rotating said wheel, means including a crank and a connecting rod adapted to transform the rotation of said wheel into the vertical translation of the turntable with its rotating means, a counterweight balancing the weight of the turntable with its rotating means, a rocking arm (53), a pin (50) secured to said toothed wheel (38) and adapted to rock said arm in one direction, yielding means adapted to rock said arm in the opposite direction, a stud (54) adapted to stop said arm in its return movement, a rocking lever (56) operated by said arm and provided with a pin (59) engaging said notches, means connected to said turntable for actuating said stud (54) and adapted to disengage said pin (59) from said wheel (38) and automatic means for returning said selected record disc within its carriage to their position of rest when the playing of the record disc is over.

5. A magazine phonograph comprising a plurality of superposed disc-holding carriages, means for guiding said carriages horizontally, a vertically movable turntable, feeding means including a rack bar adapted to move any one of said carriages in said guiding means so as to bring a record disc over said turntable, selecting means for coupling the selected carriage to said feeding means, a sound reproducer located at the upper part of the phonograph, means for rotating the turntable, a rotary starting handle (19), a toothed wheel (38) operated by said handle and engaging said rack bar, means including a friction clutch for operatively connecting said handle to the rotating means for the turntable, a wheel (60) provided with notches, a spring barrel for rotating said wheel, means including a crank and a connecting rod adapted to transform the rotation of said wheel into the vertical translation of the turntable with its rotating means, a counterweight balancing the weight of said turntable with its rotating means, a rocking arm (53) provided with two projections, a pin (50) secured to said toothed wheel (38) and adapted to rock said arm in one direction, yielding means adapted to rock said arm in the opposite direction, a stud (54) adapted to stop said arm in its return movement, a rocking lever 56 operated by said projections on the arm (53) successively, a pin (59) on said lever and engaging said notches, a rotating cam operated by the turntable, a pivoting lever (92) operated by said cam, means for transmitting the movement of said lever to said stud (54) and automatic means for returning said selected record disc within its carriage to their position of rest when the playing of the record disc is over.

6. A magazine phonograph comprising a plurality of superposed disc-holding carriages, means for guiding said carriages horizontally, a vertically movable turntable, feeding means including a rack bar adapted to move any one of said carriages in said guiding means so as to bring a record disc over said turntable, selecting means for coupling the selected carriage to said feeding means, a sound reproducer located at the upper part of the phonograph, means for rotating the turntable, a rotary starting handle (19) and means for operatively connecting said handle to the rack bar and to the rotating means for the turntable, a notch on said rack bar, a pivoting lever (41) adapted to engage said notch when the record disc is in position over the turntable, a wheel (60) provided with notches, a spring barrel for rotating said wheel, means including a crank and a connecting rod adapted to transform the rotation of said wheel into the vertical translation of the turntable, a counterweight balancing the weight of the turntable with its rotating means, means connected to said rack bar and to said turntable for releasing and stopping said wheel successively, a rocking arm 103) adapted to be rocked in one direction by the turntable when the latter is descending, yielding means adapted to return said arm in its initial position, means on said arm adapted to disengage said lever (41) from the rack bar, and the yielding means recalling the rack bar and the selected record disc within its carriage to their initial position.

7. A magazine phonograph comprising a plurality of superposed disc-holding carriages, means for guiding said carriages horizontally, a vertically movable turntable, feeding means including a rack bar adapted to move any one of said carriages in said guiding means so as to bring a record disc over said turntable, selecting means for coupling the selected carriage to said feeding means, a sound reproducer located at the upper part of the phonograph, means for rotating the turntable, a rotary starting handle (19) and means for operatively connecting said handle to the rack bar and to the rotating means for the turntable, a wheel (60) provided with notches, a spring barrel for rotating said wheel, means including a crank- and a connecting rod adapted to transform the rotation of said wheel into the vertical translation of the turntable, a counterweight balancing the weight of the turntable with its rotating means, means connected to said rack bar and to said turntable for releasing and stopping said wheel successively, automatic means for returning said selected record disc within its carriage to its position of rest when the playing of the record disc is over, means for retarding the ascent and descent of said turntable and an air brake operatively connected to said rack bar.

8. A magazine phonograph comprising a plurality of superposed disc-holding carriages, means for guiding said carriages horizontally, a vertically movable turntable, feeding means including a rack bar adapted to move any one of said carriages in said guiding means so as to bring a record disc over said turntable, selecting means for coupling the selected carriages to said feeding means, a sound reproducer located at the upper part of the phonograph and connected to a pivotally mounted sound arm, means for guiding the same during the starting and at the end of the playing of the record disc, means for rotating said turntable, means adapted to lift the selected record disc, the turntable and its rotating means and hold the record disc in engagement with the reproducer and automatic means for returning said turntable, said rotating means and said selected disc within its carriage to their position of rest when the playing of the record disc is over.

In witness whereof I affix my signature.

CYRIL DE VERE.